US012724703B2

(12) United States Patent
Bondarenko

(10) Patent No.: US 12,724,703 B2
(45) Date of Patent: Sep. 1, 2026

(54) SOCKET CONNECTIONS AMONG PROCESSING-ELEMENT BANKS AND CHIPS

(71) Applicant: At-memory Computing LP, Wilmington, DE (US)

(72) Inventor: Maksym Bondarenko, Richmond Hill (CA)

(73) Assignee: At-memory Computing LP, Wilmington, DE (US)

( * ) Notice: Subject to any disclaimer, the term of this patent is extended or adjusted under 35 U.S.C. 154(b) by 0 days.

(21) Appl. No.: 18/675,734

(22) Filed: May 28, 2024

(65) Prior Publication Data

US 2025/0370919 A1 Dec. 4, 2025

(51) Int. Cl.
*G06F 12/02* (2006.01)

(52) U.S. Cl.
CPC ................................ *G06F 12/0223* (2013.01)

(58) Field of Classification Search
CPC .. G06F 12/02; G06F 12/0246; G06F 12/0223; G06F 12/023
See application file for complete search history.

(56) References Cited

U.S. PATENT DOCUMENTS

| | | | | |
|---|---|---|---|---|
| 10,133,571 | B1 * | 11/2018 | Kesiraju | G06F 9/3858 |
| 11,614,947 | B2 * | 3/2023 | Snelgrove | G06F 15/7821 712/22 |
| 12,001,699 | B2 * | 6/2024 | Kwon | G06F 3/0634 |
| 2010/0200660 | A1 * | 8/2010 | Moed | G06K 7/14 235/470 |
| 2017/0220499 | A1 * | 8/2017 | Gray | G06F 13/36 |
| 2020/0004707 | A1 * | 1/2020 | Pirzadeh | G06F 13/20 |
| 2020/0394046 | A1 * | 12/2020 | Snelgrove | G06F 13/4068 |
| 2022/0334983 | A1 * | 10/2022 | Kumashikar | G06F 13/124 |
| 2023/0229450 | A1 * | 7/2023 | Snelgrove | G06F 12/0284 712/22 |

OTHER PUBLICATIONS

S. M. P.D et al., "A Scalable Network-on-Chip Microprocessor With 2.5D Integrated Memory and Accelerator," in IEEE Transactions on Circuits and Systems I: Regular Papers, vol. 64, No. 6, pp. 1432-1443, Jun. 2017.*

L. Shannon and P. Chow, "Simplifying the integration of processing elements in computing systems using a programmable controller," 13th Annual IEEE Symposium on Field-Programmable Custom Computing Machines (FCCM'05), Napa, CA, USA, 2005, pp. 63-72.*

* cited by examiner

*Primary Examiner* — Pierre Michel Bataille
(74) *Attorney, Agent, or Firm* — Mendelsohn Dunleavy, P.C.; Steve Mendelsohn

(57) ABSTRACT

An example device includes a plurality of integrated circuits. Each integrated circuit includes a set of banks. Each bank includes an array of processing elements configured for single instruction, multiple data (SIMD) operations. The device further includes a set of sockets and an external interface. Each socket is configurable to connect to any bank selected from the set of banks. The external interface is connected to the set of sockets. At least two external interfaces of respective integrated circuits are connected for bidirectional communication between the respective integrated circuits. Respective sockets of the respective integrated circuits are connectable to exchange credit for data between two respective banks.

20 Claims, 9 Drawing Sheets

SOCKET CONNECTIONS AMONG PROCESSING-ELEMENT BANKS AND CHIPS

BACKGROUND

Computing devices that use single instruction, multiple data (SIMD) architecture may be limited in how data and other information may be communicated among processing elements. Spatial architecture may provide for fast and efficient parallel processing but may suffer from logistic problems in getting transporting information to where it is needed.

DETAILED DESCRIPTION

This disclosure provides techniques for transporting information within and among integrated circuits (chips) that implement SIMD architecture, which may also be termed at-memory compute or spatial architecture. Described herein are methodologies that use sockets and busses to efficiently communicate information with reduced or minimal overhead.

Figure 1:
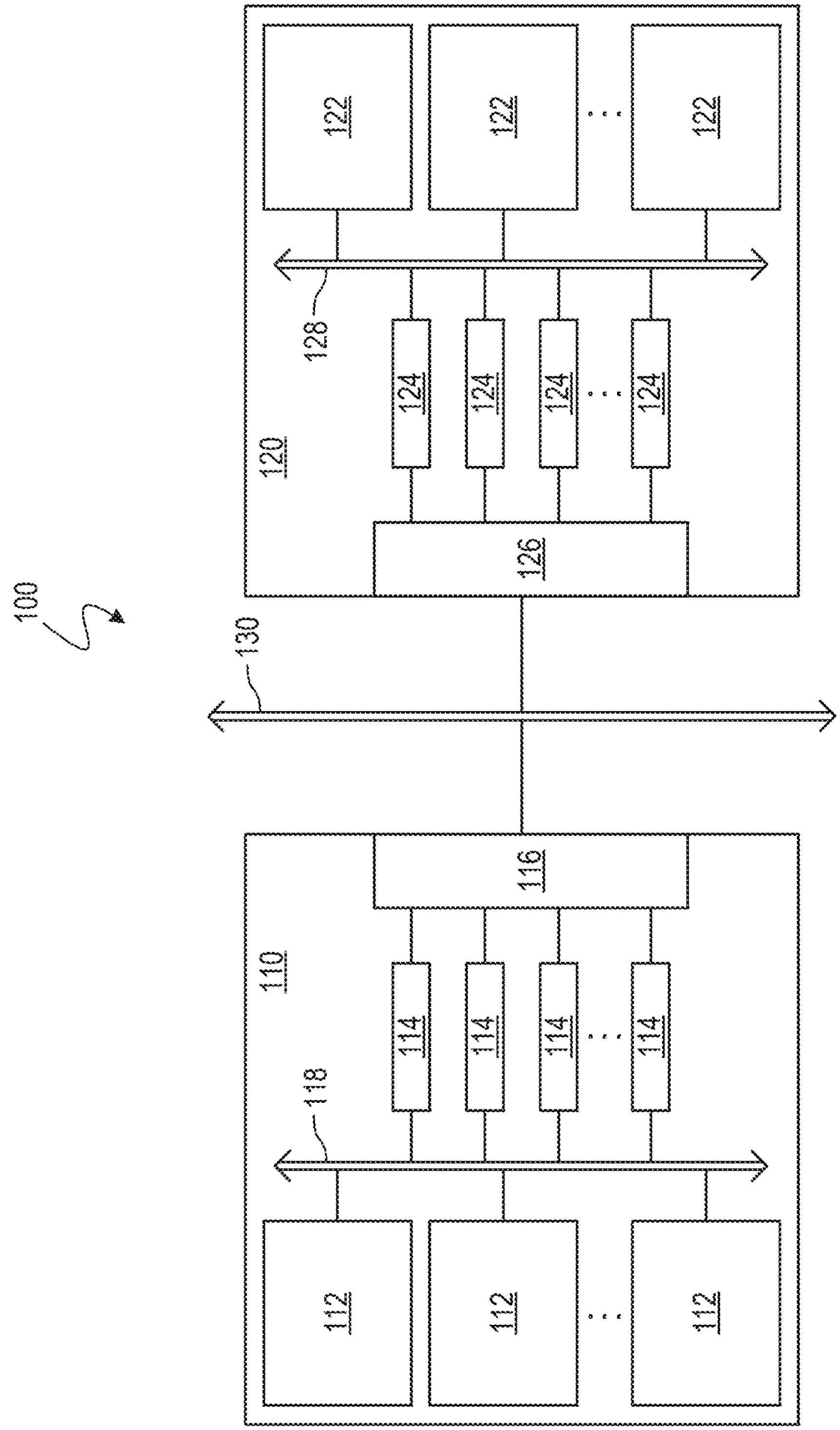
FIG. 1 is a block diagram of an example device with sockets providing for communication between processing-element banks of two or more integrated circuits.

FIG. 1 shows an example device 100 with sockets providing for communication between processing-element banks of two or more integrated circuits 110, 120. An integrated circuit, which may also be termed a "chip," is a packaged silicon wafer (or other substrate) on which logic, processors, and/or other circuity is disposed. Any suitable number of integrated circuits 110, 120 may be provided. The integrated circuits 110, 120 are substantially the same, unless otherwise mentioned. Designations, such as "first", second," and "third," serve only to distinguish integrated circuits are their components from each other for sake of explanation.

The device 100 may be connected to a host system that provides a program to the device 100 and that expects output of the program during and/or after execution by the device. The host system may also provide a user interface and other components to support operations of the device 100. The host system may be a conventional computing device, such as a desktop/notebook computer, server, smartphone, or vehicle-based computer.

The integrated circuits 110, 120 may be programmed to perform artificial intelligence (AI) processing, inference processing, massively parallel processing, or similar. The integrated circuits 110, 120 may be programmed to implement a neural network.

A first integrated circuit 110 includes a set of first banks 112, a set of first sockets 114, and a first external interface 116.

Each first bank 112 includes an array of processing elements configured for single instruction, multiple data (SIMD) operations. A bank 112 is a discrete physical element of computational processing resources. See FIG. 6 or 7 for an example of such a bank.

Each first socket 114 is configurable to connect to a selected first bank 112 of the set. A socket 114 includes a buffer and provides communications between a selected bank 112 and another selected bank of the second integrated circuit 120. Such communication includes flow of credit in one direction and flow of data in the opposite direction. Credit indicates a capacity to receive data.

The first integrated circuit 110 may include a first bus 118 to connect the set of first banks 112 to the set of first sockets 114. The bus 118 may allow for any bank 112 to communicate with any socket 114.

The first external interface 116 is connected to the set of first sockets 114. The external interface 116 may connect to a high-speed bus 130.

A second integrated circuit 120 includes a set of second banks 122, a set of second sockets 124, and a second external interface 126.

Each second bank 122 includes an array of processing elements configured for SIMD operations. As mentioned above, a bank 122 is a discrete physical element of computational processing resources. See FIG. 6 or 7 for an example.

Each second socket 124 is configurable to connect to a selected second bank 122 of the set. A socket 124 includes a buffer and provides communications between a selected bank 122 and another selected bank of the first integrated circuit 110. Such communication includes flow of credit in one direction and flow of data in the opposite direction. As mentioned, credit indicates a capacity to receive data.

The second integrated circuit 120 may include a second bus 128 to connect the set of second banks 122 to the set of second sockets 124. The bus 128 may allow for any bank 122 to communicate with any socket 124.

The second external interface 126 is connected to the set of second sockets 124. The external interface 126 may connect to the high-speed bus 130.

The integrated circuits 110, 120 are connected via their respective external interfaces 116, 126 and the bus 130 to provide bidirectional communications between the integrated circuits 110, 120. The external interfaces 116, 126 and bus 130 may conform to a standard, such as a Peripheral Component Interconnect Express (PCIe) standard.

A pair of first and second sockets 114, 124 is connectable, via the first and second external interfaces 116, 126 and the bus 130. In a given connection, credit is communicated in one direction between the respective banks 112, 122 as controlled by the connected sockets 114, 124 and data is communicated in an opposite direction between the respective banks 112, 122 as controlled by the connected sockets 114, 124.

Figure 2A:
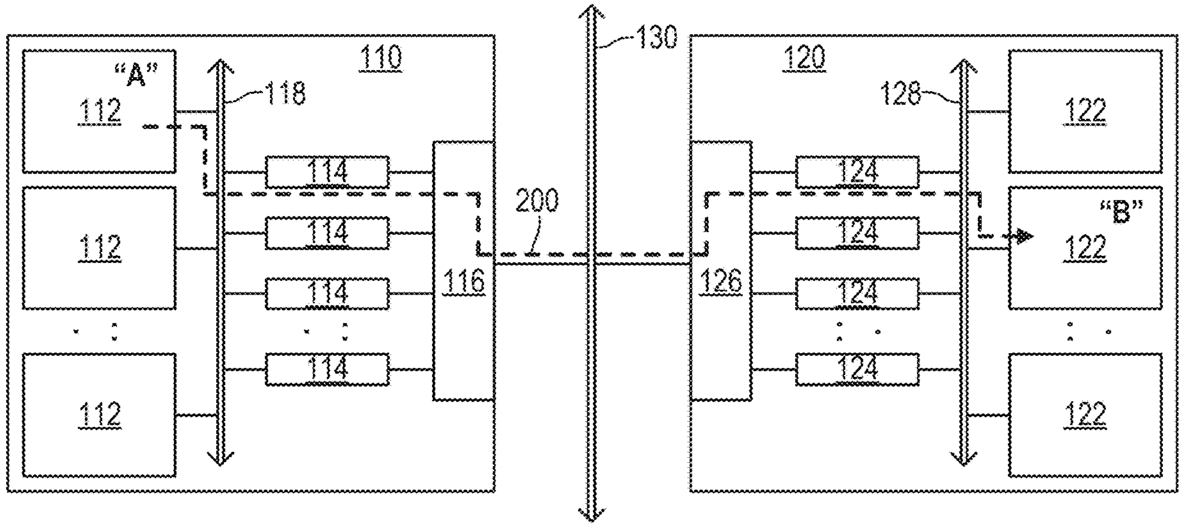
FIG. 2A is a block diagram of the example device of FIG. 1 showing example communication of credit between banks and sockets.
Figure 2B:
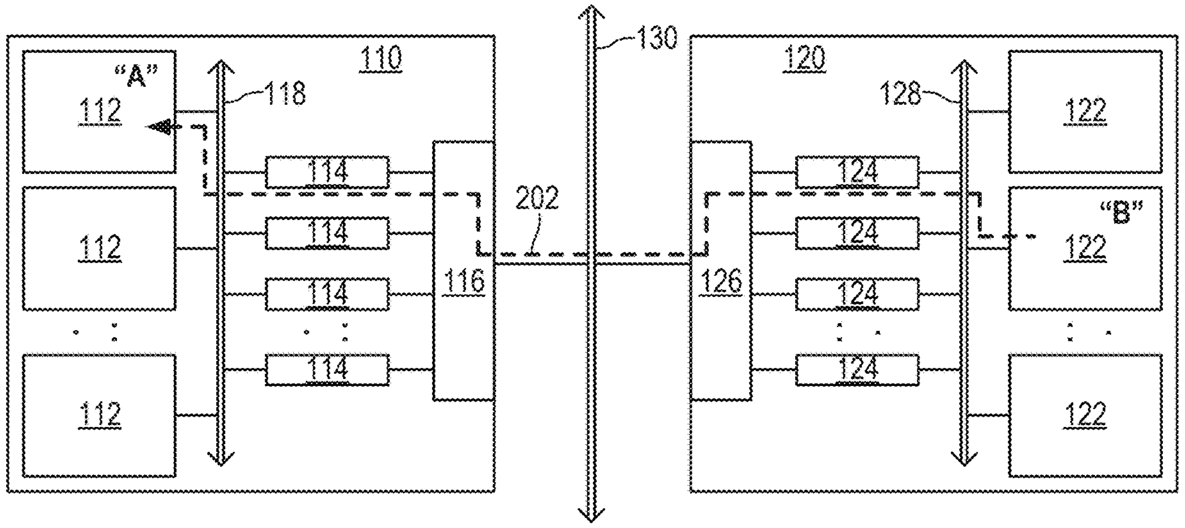
FIG. 2B is a block diagram of the example device of FIG. 1 showing example communication of data between banks and sockets.

FIGS. 2A and 2B show example operation of the example device 100.

With reference to FIG. 2A, at the first integrated circuit 110, a first bank 112, indicated at "A," connects to a first socket 114. Similarly, at the second integrated circuit 120, a second bank 122, indicated at "B," connects to a second socket 124. The first socket 114 and second socket 124 connect via the respective external interfaces 116, 126 and the bus 130, thereby forming a pathway 200 from bank "A" to bank "B" for the communication of credit and a pathway 202 from bank "B" to bank "A" for the communication of data. The pathways 200, 202 may be reversed if the direction of data flow is to be reversed.

Bank "A" communicates credit to the connected first socket 114 to indicate the capacity of bank "A" to receive data. Credit may indicate available buffer space of bank "A" or of a processing element or group of processing elements of bank "A." The first socket 114 maintains the credit of bank "A" and further determines its own credit, e.g., its buffer capacity. The first socket 114 then communicates its credit to the second socket 124. The second socket 124 receives credit from the first socket 114 and communicates the credit to the connected bank "B." Thus, bank "A" expresses a capacity to receive data and bank "B" is informed of the data-receiving capacity of the socket 114 that supports bank "A."

Bank "B" transmits data to the second socket 124 up to the amount indicated by the credit. The second socket 124 transmits the data to the first socket 114, which in turn transmits the data to bank "A." As data is communicated, credit is reduced accordingly such that accurate capacities of bank "A" and the connected socket 114 are tracked. Any remaining capacity may be indicated to bank "B" and used for further communication of data.

Figure 3A:
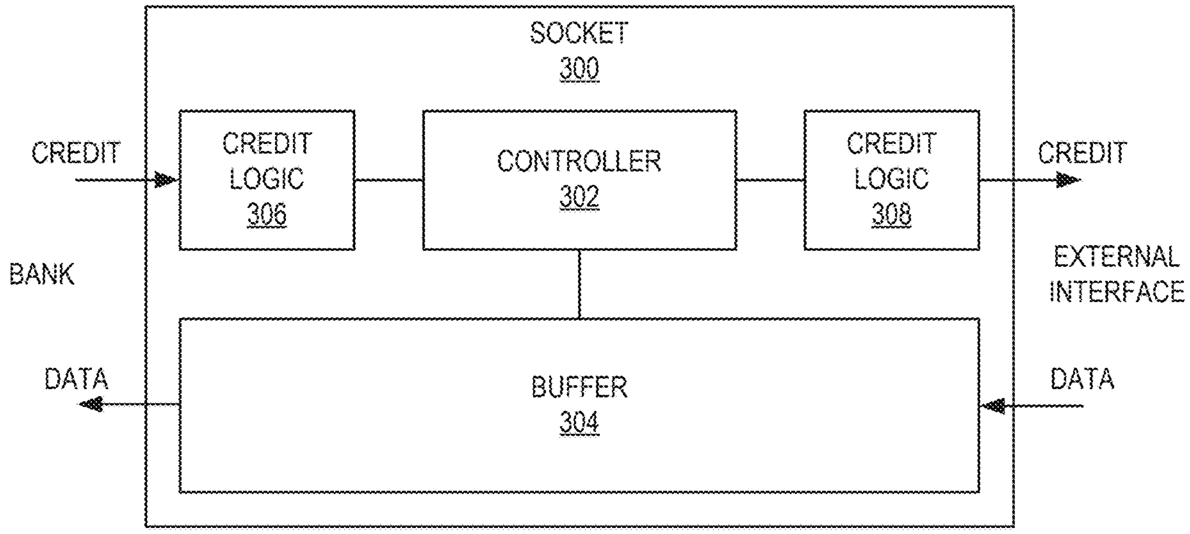
FIGS. 3A and 3B are block diagrams of an example socket useable with the device of FIG. 1.
Figure 3B:
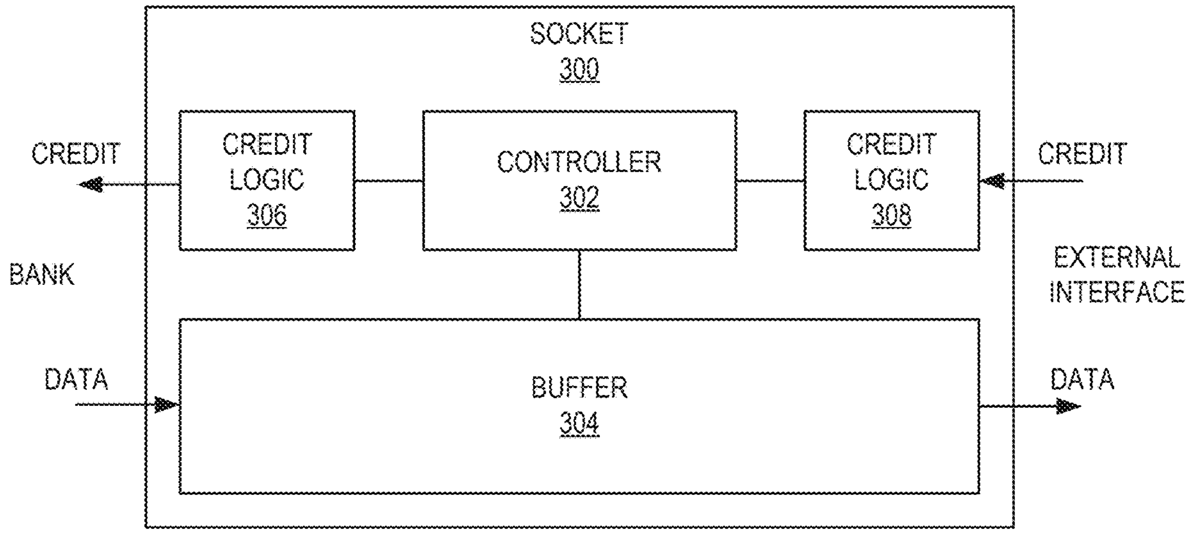

FIGS. 3A and 3B shows an example socket 300 that may be used for any of the sockets discussed herein, such as the sockets 114, 124.

The socket 300 includes controller 302, a buffer 304, and credit logic 306, 308.

The controller 302 is configured to connect the socket 300 to a selected bank. The controller 304 is also configured to control data flow through the buffer 304 and track credit with the credit logic 306, 308. The controller 302 may include a logic circuit, a microprocessor, or a combination of such.

The buffer 304 is connected to the controller 302 and the external interface and is configurable by the controller 302 to connect to the selected bank. The buffer 304 stores data communicated between the connected bank and the external interface. The buffer 304 temporarily stores data as the data is being communicated to/from the connected bank. The buffer 304 has a capacity that may limit the amount of data that can be communicated at a given time.

Bank credit logic 306 is connected to the controller 302 and is configurable by the controller 302 to connect to the selected bank.

Socket credit logic 308 is connected to the controller 302 and the external interface.

FIG. 3A shows the directions of credit and data flow at the socket 300 when the socket is configured to transmit credit and receive data for its connected bank.

The bank credit logic 306 receives an indication of credit from the connected bank. The bank credit logic 306 tracks the current amount of data that the connected bank can accept. The bank credit logic 306 updates its credit based on the amount of data transmitted to the connected bank through the buffer 304. Data transmitted to the connected bank reduces the credit tracked by the bank credit logic 306.

The socket credit logic 308 tracks credit available at the socket 300. That is, the socket credit logic 308 tracks the current amount of data that the buffer 304 can accept, which may be different from the amount of data that the connected bank can accept. The socket credit logic 308 updates its credit based on the usage of the buffer 304. Credit tracked by the socket credit logic 308 is proportional to the available space in the buffer 304.

The bank credit logic 306 and the socket credit logic 308 cooperate with the controller 302 to track, respectively, the amount of data that may be communicated to the connected bank and the amount of data that may be received via the external interface and stored in the buffer 304. The controller 302 may command data to be transmitted from the buffer 304 to the connected bank, when the bank credit logic 306 indicates that the connected bank has capacity for such data. The bank credit logic 306 decrements its count accordingly, as data is transmitted to the bank. The controller 302 may indicate to the remote socket, connected via the external interface, the credit tracked by the socket credit logic 308 to indicate to the remote socket the amount of data that the buffer 304 can accept. The socket credit logic 308 decrements its count accordingly, as data is received from the remote socket.

FIG. 3B shows the directions of credit and data flow at the socket 300 when the socket is configured to receive credit and transmit data from its connected bank.

The socket credit logic 308 receives an indication of credit from the connected remote socket. The socket credit logic 308 may limit the received credit to the space available at the buffer 304.

The bank credit logic 304 forwards the credit to the connected bank, which transmits data to the buffer 304 up to the amount of credit indicated.

The controller 302 controls the buffer 304 to transmit the data to the connected remote socket. As data is received at the buffer 304 and transmitted from the buffer 304, the controller 302 controls the bank credit logic 304 to updates its credit and indicate same to the connected bank, so that the connected bank may continue to transmit data and consume any remaining credit.

Each socket 300 in a device may be configured, for example, at program initialization, as a socket that transmits credit and receives data or as a socket that receives credit and transmits data.

Figure 4:
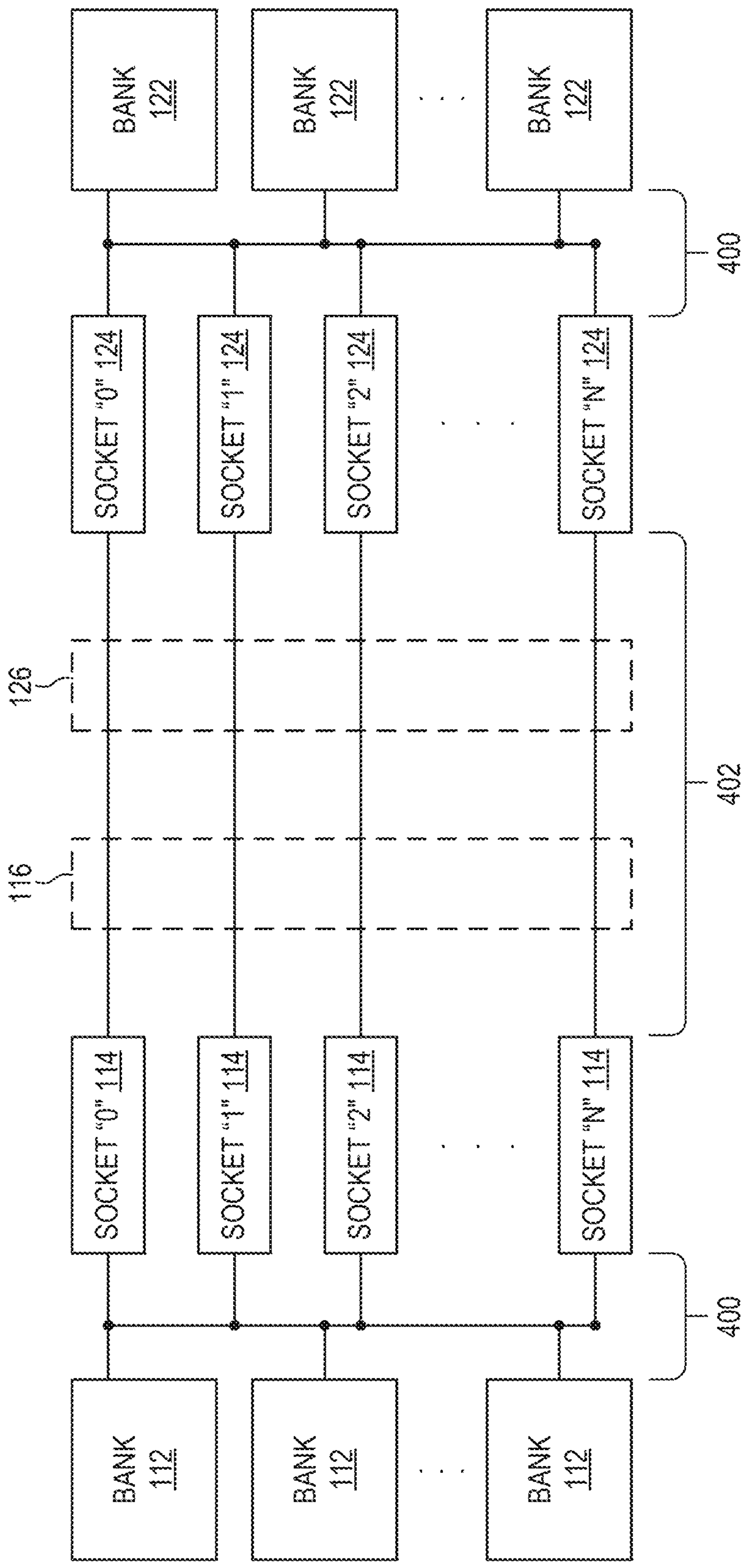
FIG. 4 is a diagram of example connections within the example device of FIG. 1.

FIG. 4 is a diagram of example connections within the device 100.

Sockets 114, 124 may be permanently connected in a one-to-one fashion, shown as connections 402. That is, each first socket 114, numbered "0" to "N," may be permanently connected to a corresponding second socket 124, numbered "0" to "N." For example, first socket 114 number "0" is permanently connected to second socket 124 number "0," first socket 114 number "1" is permanently connected to second socket 124 number "1," and so on. Such connections may be considered channels. Such permanent connections may be realized with unique socket IDs that are used by the external interfaces 116, 126.

Connections 400 between sockets 114, 124 and banks 112, 122 are configurable so that any bank 112, 122 may be connected to any respective socket 114, 124. Each bank 112, 124 may have a unique address that is programmed into a socket 114, 124 when a program is initialized at the device 100. Alternatively or additionally, each socket 114, 124 may have a unique address that is programmed into a bank 112, 124 when a program is initialized at the device 100.

Once bank 112, 122 and socket 114, 124 connections 400 are established and because permanent socket-to-socket connections 402 are used, it is not necessary to communicate addresses via the external interfaces 116, 126 and only packet payload and packet type may be required.

Figure 5:
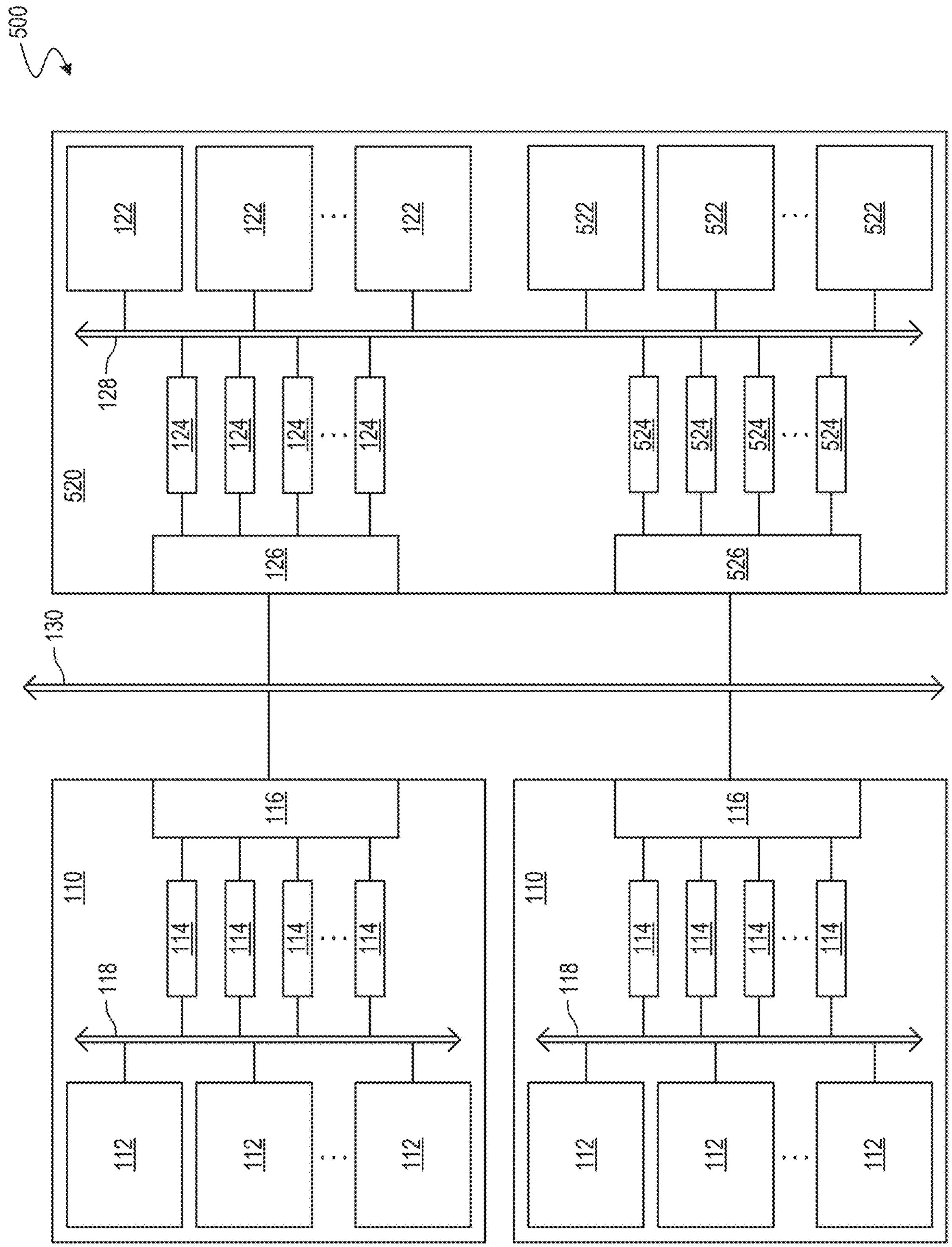
FIG. 5 is a block diagram of another example device with sockets providing for communication between processing-element banks of two or more integrated circuits.

FIG. 5 shows an example device 500 The device 500 is similar to the device 100 and only differences will be discussed in detail.

The device 500 includes one or more first integrated circuits 110, as previously discussed. In this example the device 500 includes two first integrated circuits 110.

The device 500 also includes at least one second integrated circuit 520, which is similar to the second integrated circuit 120 discussed above. The second integrated circuit 120 includes components 122-128, as discussed above.

The second integrated circuit 120 further includes one or more additional sets of components 522-526 that are similar or identical to components 122-126. The components 522-526 may share the same bus 128.

Specifically, the second integrated circuit 120 further includes a set of third banks 522, a set of third sockets 524, and a third external interface 526.

Each third bank 522 includes an array of processing elements configured for SIMD operations. As mentioned above, a bank 522 is a discrete physical element of computational processing resources. See FIG. 6 or 7 for an example.

Each third socket 524 is configurable to connect to a selected third bank 522 of the set. A socket 524 includes a buffer (see socket 300) and provides communications between a selected bank 522 and another selected bank of a first integrated circuit 110. Such communication includes flow of credit in one direction and flow of data in the opposite direction. As already mentioned, credit indicates a capacity to receive data.

The second bus 128 provides communication among the third banks 522, third sockets 524, second banks 122, and second sockets 124.

The third external interface 526 is connected to the set of third sockets 524. The external interface 526 connects to the high-speed bus 130 as with the other external interfaces 116, 126.

The integrated circuits 110, 120 are connected via their respective external interfaces 116, 126, 526 and the bus 130 to provide bidirectional communications between the sockets 114, 124, 524 on the integrated circuits 110, 120. As mentioned elsewhere herein, the external interfaces 116, 126, 526 and bus 130 may conform to a PCIe standard.

Accordingly, it should be understood from the device 500 that any suitable number of integrated circuits may use the connectivity provided by the techniques discussed herein and that a particular integrated circuit may contain any suitable number of sets of sockets and sets of banks. Connections 400, 402 (see FIG. 4) may be used, such that corresponding sockets 114, 124, 524 are permanently connected.

Figure 6:
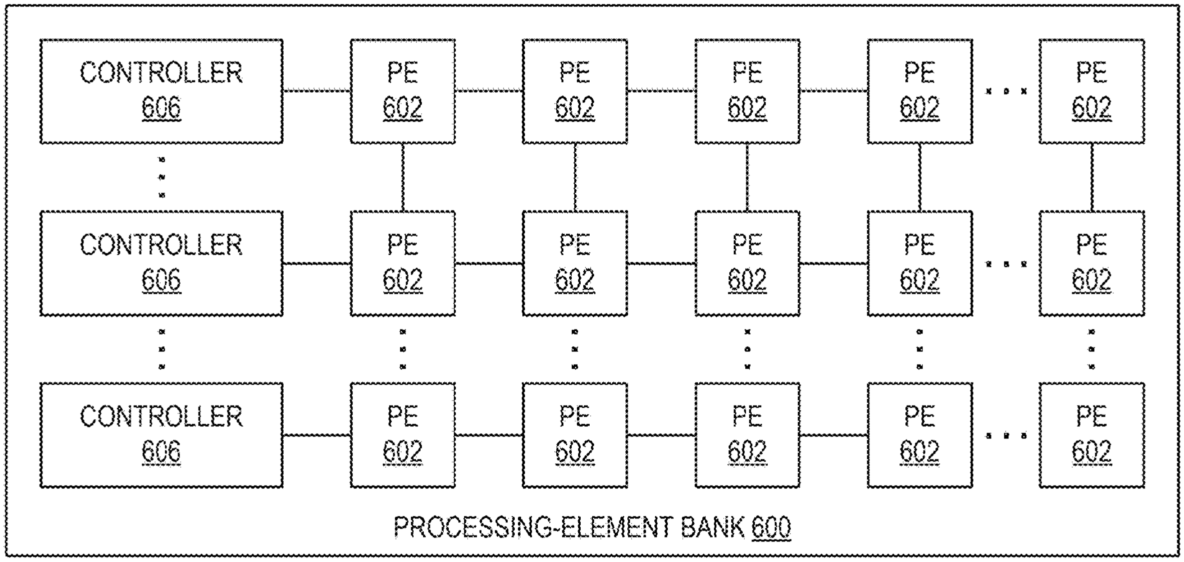
FIG. 6 is a block diagram of an example bank of processing elements useable with the example devices of FIGS. 1 and 5.

FIG. 6 shows an example bank of processing elements 600. The bank 600 is a computing device, which may be termed a SIMD or at-memory computing device. U.S. Pat. No. 11,881,872, which is incorporated herein by reference, may be referenced for additional details concerning devices that may be used or adapted to be used as the bank 600.

The bank 600 Includes an array of processing elements or PEs 602. Processing elements 602 may be logically and, optionally, physically arranged in a two-dimensional array. Such an array may be considered to have rows and columns.

Each processing element 602 includes circuitry to perform operations, such as multiplying accumulations. For example, each processing element 602 may include a multiplying accumulator and supporting circuitry. The processing element 602 may additionally or alternatively include an arithmetic logic unit (ALU).

Each processing element 602 includes or is connected to working memory dedicated to that processing element 602. A processing element 602 may be connected with one or more neighboring processing elements 602 to share data and/or instructions. Processing element interconnections may be provided in the row direction, the column direction, or both.

The bank 600 further includes a controller 606 connected to a subset of processing elements 602 (e.g., a row or column of PEs). The controller 606 is a processor (e.g., microcontroller, etc.) that may be configured with instructions to control the connected processing elements 602.

The controller 606 controls the connected processing elements 602 to perform the same operation on different data contained in each processing element 602. The controller 606 may further control loading/retrieving of data to/from the processing elements 602, control the communication among processing elements 602, and/or control other functions for the processing elements 602. Any suitable number of controllers 606 may be provided to control the processing elements 602. Controllers 606 may be connected to each other for mutual communications. Controllers 606 may be arranged in a hierarchy, in which, for example, a main controller controls sub-controllers, which in turn control subsets of processing elements 602.

Figure 7:
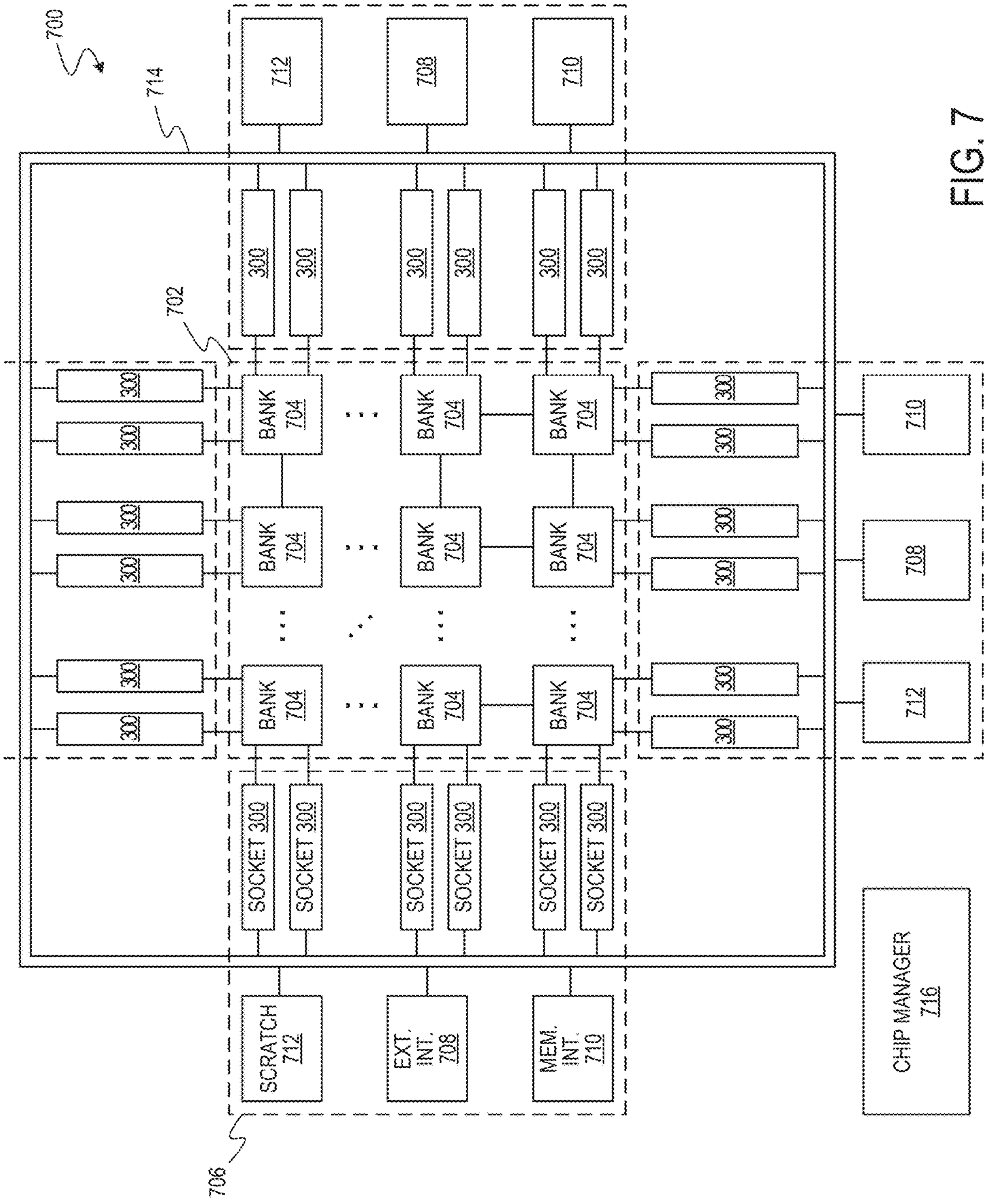
FIG. 7 is a block diagram of another example device with sockets providing for communication between processing-element banks.

FIG. 7 shows an example device 700 with sockets providing for communication between processing-element banks of two or more integrated circuits. The device 700 resides on one integrated circuit and may be in communication with one or more other devices residing on one or more other integrated circuits. The description of components elsewhere herein with like terminology and/or like reference numerals may be referenced for detail not repeated here.

The device 700 include an array 702 (e.g., a grid) of banks 704 of processing elements. The banks 704 may be interconnected to share information by way of, for example, an internal bus (not shown) or bank-to-bank connections. The array 702 may include additional components, such as one or more controllers (not shown).

The device 700 further includes one or more input/output (I/O) hubs 706 arranged at the perimeter of the processing array 702. An I/O hub 706 includes a plurality of sockets 300 and an external interface 708. The I/O hub 706 may also include other components, such as a memory interface 710 and a scratchpad 712. In this example, the device 700 include four I/O hubs 706, one at each side of the rectangular processing array 702 (one of the hubs 706 is partially illustrated). In other examples, any suitable number of I/O hubs 706 may be used.

The banks 704 are physically connected to the sockets 300 of the I/O hubs 706. The outside/perimeter banks 704 of the array 702 may be directly connected to respective sockets 300. Internal banks 704 may be indirectly connected to the sockets 300 via bank interconnections or a bus internal to the array 702. In this example, any bank 704 may be programmed to connect to any socket 300.

The device 700 further includes a packet bus 714. The bus 714 may extend around the sides of the processing array 702 and through each of the I/O hubs 706. The bus 714 may be similar or identical to the bus 130 discussed elsewhere herein.

The sockets 300 and external interface 708 of each I/O hub 706 are connected to the packet bus 714. The memory interface 710 and scratchpad 712 may also be connected to the bus 714.

Banks 704 may communicate credits and data with each other via the sockets 300 and packet bus 714. As discussed elsewhere herein, sets of sockets 300, whether on the device 700 or on another device 700, may be permanently connected to form channels, such that any banks 704 connected to a socket 300 of the connected set may communicate. For example, two sockets 300 in different I/O hubs 706 on the same device 700 may be connected, such that banks 704 connected to the sockets 300 may communicate with each other via the bus 714 rather than using internal interconnections or an internal bus, if provided. Communications between banks 704 of different devices 700 are also facilitated by a set of connected sockets 300 and also by the external interfaces 708 of such devices 700.

The device further includes a chip manager 716 that is configured to establish the connections of banks 704 to sockets 300. The chip manager 716 may establish such connections during initialization of a program to be executed by the device 700 or set of devices 700.

Figure 8:
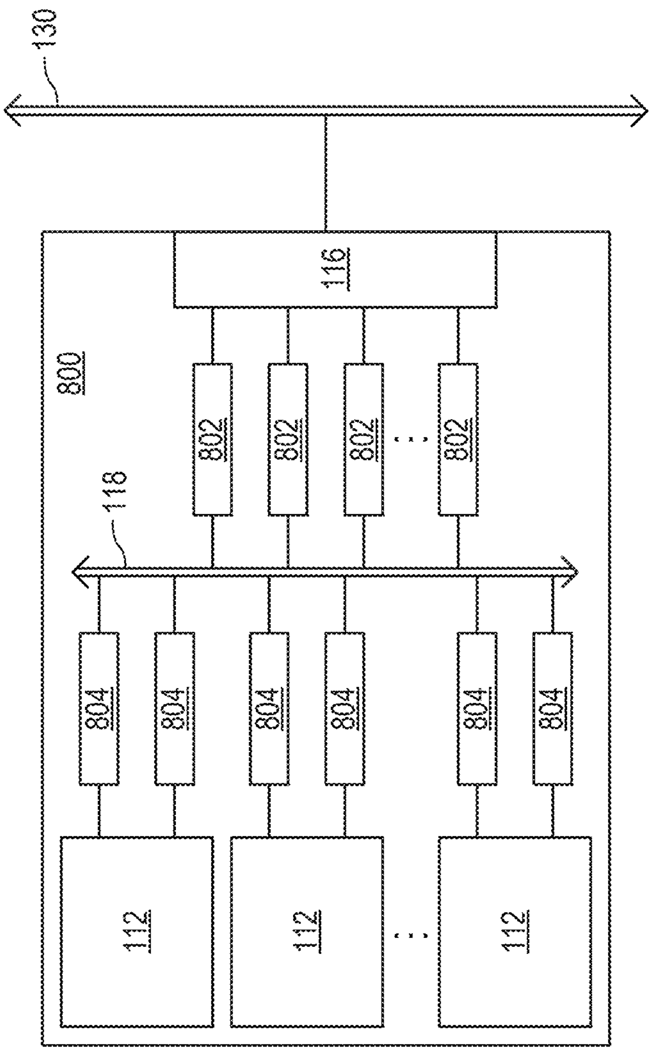
FIG. 8 is a block diagram of another example device with bank-side and interface-side sockets providing for communication.

FIG. 8 shows an example device 800 with sockets providing for communication. The device 800 is an integrated circuit that may be used as any of the integrated circuits discussed herein, such as the integrated circuits 110, 120, 520. The above description may be referenced for details not repeated here. Like reference numerals and/or like terminology denote like components.

The device 800 includes two sets of sockets 802, 804. Sockets 802 connect an external interface 116 to a bus 118. Sockets 802 serve a role similar or identical to sockets 114, 124, etc. discussed above.

Bank-side sockets 804 connect processing-element banks 112 to the bus 118. The sockets 804 are functionally the same as sockets 114, 124, etc. discussed above, while serving a different role. Bank-side sockets 804 provide for communication between the banks 112 and the bus 118. Each bank 112 may have any suitable number of permanently connected bank-side sockets 804. In this example, each bank 112 has two bank-side sockets 804, but more or fewer would also be useful. Each bank-side socket 804 may communicate credit and data and may be similar or identical to socket 300.

The interface-side sockets 802 provide for permanent connections to other devices by unique socket IDs that are used by the external interface 116 and any connecting external interface. This may be considered to form channels, as discussed above.

Bank-side sockets 804 are configured to selectively connect to interface-side sockets 802. In this example, any bank-side socket 804 may be controlled to connect to any interface-side socket 802. As such, any bank 112 has access to any channel controlled by the interface-side sockets 802 and external interface 116. Addresses may be used to facilitate such connections. In effect, bank-side sockets 804 are an example implementation of the connections 400, discussed above.

Figure 9:
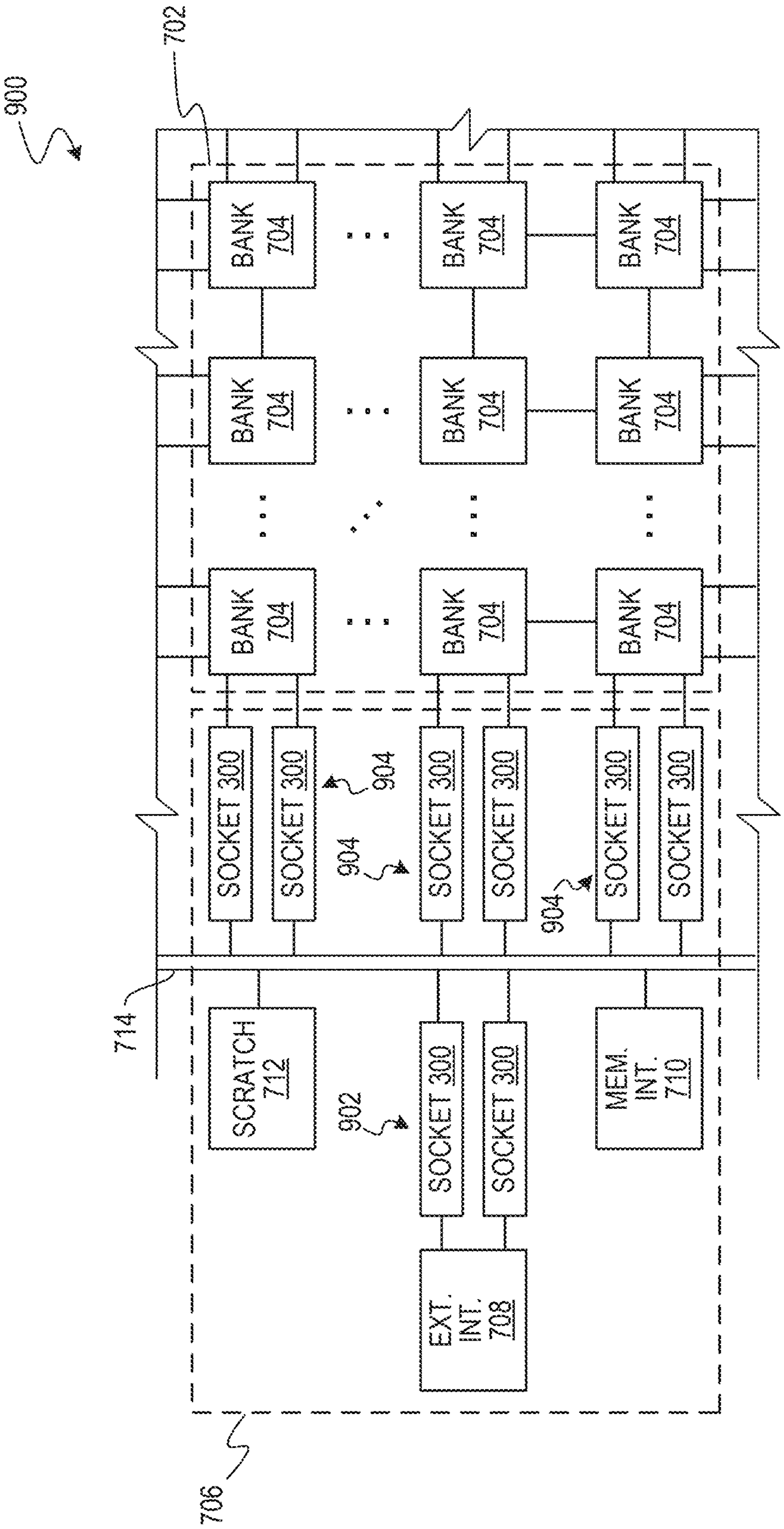
FIG. 9 is a block diagram of another example device with sockets providing for communication between processing-element banks.

The principles of FIG. 8 may be applied to the example device of FIG. 7, as shown in FIG. 9.

FIG. 9 shows a portion of an example device 900 with sockets providing for communication between processing-element banks of two or more integrated circuits. The device 900 resides on one integrated circuit and may be in communication with one or more other devices residing on one or more other integrated circuits. The description of components elsewhere herein with like terminology and/or like reference numerals may be referenced for detail not repeated here. The device 900 is the same as the device 700 except the discussion below.

The device 900 includes a set 902 of interface-side sockets 300, which may be similar or the same as interface-side sockets 802 discussed above. The interface-side sockets 300 connect the external interface 708 to the bus 714 and form channels for communications within the device 900 and to other devices. When more than one external interface 708 is provided, such as shown in FIG. 7, corresponding sets 902 of interface-side sockets 300 may be provided.

The device 900 includes sets 904 of bank-side sockets 300. which may be similar or the same as bank-side sockets 804 discussed above. Each set 904 of bank-side sockets 300 connects a bank 704 to the bus 714. Each bank-side socket 300 may be selectively connected to a interface-side socket 300 to use the respective channel provided by the interface-side socket 300 for on- or off-chip communications.

Also, it should be noted that the memory interface 710 and scratch pad 712 may each be provided with one or more sockets 300 (not shown) to facilitate communications with these components 710, 712 using the techniques discussed herein.

In view of the above, it should be apparent that the relatively simple socket and bus arrangements described provide for efficient connectivity among processing-element banks on different chips or even on the same chip. Addressing is simplified as socket-to-socket connections are permanent and as banks of processing elements are uniquely addressable. Two banks in communication do not need mutual knowledge of their respective locations or addresses. In addition, backpressure provided by credits prevents banks from overloading communications pathways with data.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:

a first integrated circuit including:

- a set of first banks, wherein each first bank includes an array of processing elements configured for single instruction, multiple data (SIMD) operations;
- a set of first sockets, wherein each first socket is configurable to connect to any first bank selected from the set of first banks; and
- a first external interface connected to the set of first sockets;

a second integrated circuit including:

- a set of second banks, wherein each second bank includes an array of processing elements configured for SIMD operations;
- a set of second sockets, wherein each second socket is configurable to connect to any second bank selected from the set of second banks; and
- a second external interface connected to the set of second sockets;

wherein the first and second external interfaces are connected; and wherein each first socket is connectable, via the first and second external interfaces, to each second socket to communicate credit in a direction between a first bank and a second bank and to communicate data in an opposite direction between the first bank and the second bank.

2. The device of claim 1, wherein each first socket comprises a controller configured to connect the first socket to a selected first bank of the set of first banks.

3. The device of claim 2, wherein each second socket comprises a controller configured to connect the second socket to a selected second bank of the set of second banks.

4. The device of claim 3, wherein each first socket further comprises a buffer to store data communicated between the first bank and the second bank.

5. The device of claim 4, wherein each second socket further comprises a buffer to store data communicated between the first bank and the second bank.

6. The device of claim 5, wherein each first socket further comprises a credit logic to track credit communicated between the first bank and the second bank.

7. The device of claim 6, wherein each second socket further comprises a credit logic to track credit communicated between the first bank and the second bank.

8. The device of claim 1, wherein the first integrated circuit further comprises a first bus connecting the set of first banks to the set of first sockets.

9. The device of claim 8, wherein the second integrated circuit further comprises a second bus connecting the set of second banks to the set of second sockets.

10. The device of claim 8, wherein the second integrated circuit further comprises:

a set of third banks, wherein each third bank includes an array of processing elements configured for SIMD operations;

a set of third sockets, wherein each third socket is configurable to connect to any third bank selected from the set of third banks; and a third external interface connected to the set of third sockets;

wherein the set of third sockets is connected to the second bus; and wherein the second bus provides communication among the set of second banks, the set of second sockets, the set of third banks, and the set of third sockets.

11. The device of claim 1, wherein a respective permanent connection is established between each first socket and a predefined corresponding second socket.

12. The device of claim 11, wherein the respective permanent connections are realized with unique socket IDs used by the first external interface and the second external interface.

13. The device of claim 11, wherein the first and second sockets are configured to omit communicating addresses via the first and second external interfaces.

14. A device comprising:

a plurality of integrated circuits, each integrated circuit including:

a set of banks, wherein each bank includes an array of processing elements configured for single instruction, multiple data (SIMD) operations;

a set of sockets, wherein each socket is configurable to connect to any bank selected from the set of banks; and an external interface connected to the set of sockets;

wherein at least two external interfaces of respective integrated circuits are connected for bidirectional communication between the respective integrated circuits; and wherein respective sockets of the respective integrated circuits are connectable to exchange credit for data between two respective banks.

15. The device of claim 14, wherein each socket comprises a controller configured to program the socket to connect to a selected bank of the set of banks.

16. The device of claim 15, wherein each socket further comprises a buffer to store data communicated between the first bank and the second bank.

17. The device of claim 16, wherein each socket further comprises a credit logic to count credit communicated between the first bank and the second bank.

18. The device of claim 14, wherein each integrated circuit further comprises a bus connecting the set of banks to the set of sockets.

19. The device of claim 14, further comprising a high-speed bus to provide the bidirectional communication between the respective integrated circuits.

20. The device of claim 14, further comprising, a set of permanent connections between pairs of respective sockets of the respective integrated circuits whose external interfaces are connected.

* * * * *